United States Patent [19]

Hirose

[11] 4,063,086

[45] Dec. 13, 1977

[54] SCALE READING APPARATUS

[75] Inventor: Touji Hirose, Yokohama, Japan

[73] Assignee: Mitutoyo Manufacturing Co., Ltd., Tokyo, Japan

[21] Appl. No.: 725,573

[22] Filed: Sept. 22, 1976

[30] Foreign Application Priority Data

Sept. 22, 1975 Japan .......................... 50-130267[U]

[51] Int. Cl.² .............................................. H01J 3/14
[52] U.S. Cl. ............................ 250/237 G; 356/169; 250/231 R
[58] Field of Search ................. 250/237 R, 23, 237 G; 356/169, 170

[56] References Cited

U.S. PATENT DOCUMENTS 3,816,003  6/1974  Litke ..................................... 356/169
3,899,255  8/1975  Meier .................................... 356/169

Primary Examiner—Rudolph V. Rolinec
Assistant Examiner—Vincent J. Sunderdick
Attorney, Agent, or Firm—Koda and Androlia

[57] ABSTRACT

A scale reading apparatus having a dust-proof means for protection of the slide and guide surfaces, the relatively moving parts of the apparatus, from the ingress of foreign material and a means for sensing the scale reading. The dust-proof means includes a flexible band covering the entire length of the slide surfaces and an opening connecting the moving parts. The scale sensing means is resiliently mounted at an angle to the verticle thereby substantially reducing the forces applied and the affects of vibration upon the scale sensing means to insure a high precision reading.

6 Claims, 6 Drawing Figures

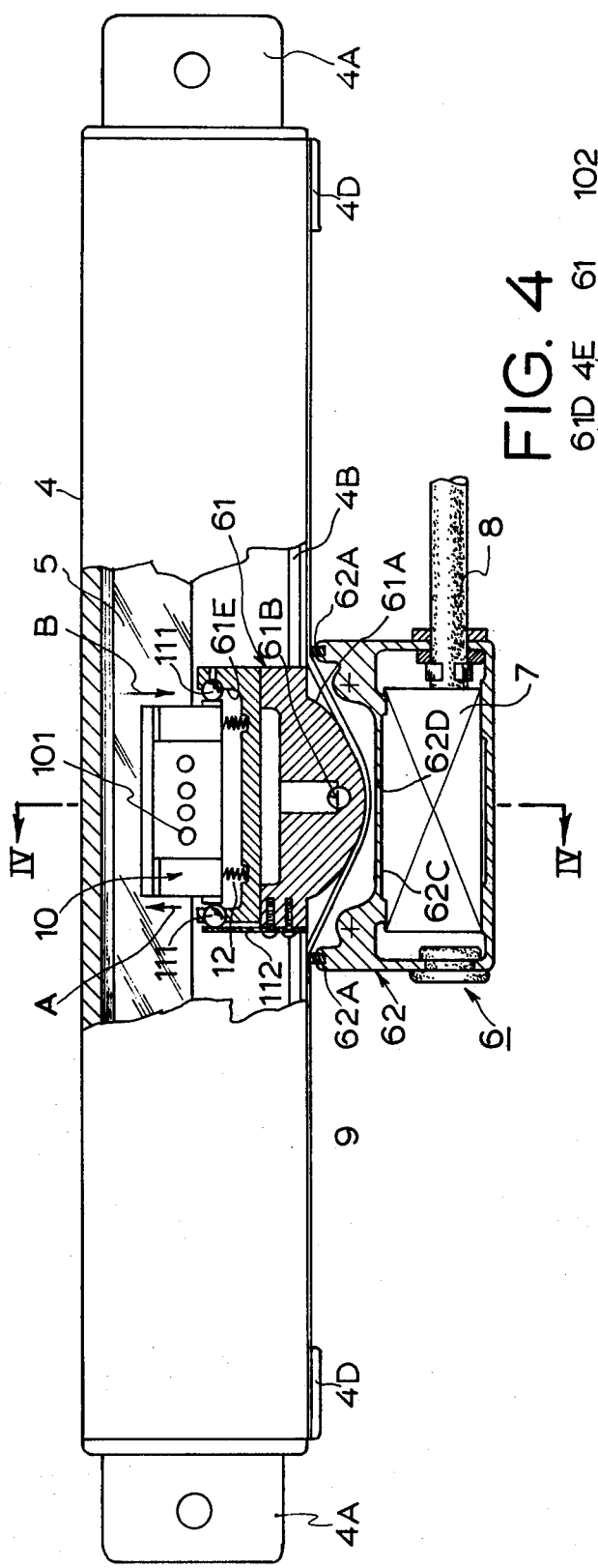

SCALE READING APPARATUS

BACKGROUND OF THE INVENTION

1. Field of Invention

This invention relates to scale reading apparatuses and more particularly to scale reading apparatuses utilized with automated machinery.

2. Prior Art

There has heretofore been known a scale reading apparatus of the type employing a sensor housed in a slider member attached to a movable member by which the sensor automatically reads the gradations on the scale attached to a fixed member. This known apparatus has had the drawback that due to inferior quality of the dust-proofing, the sliding surfaces of the slider member tend to be deteriorated or damaged by the ingress of foreign material thereby lowering the accuracy of the measurements.

SUMMARY OF THE INVENTION

Accordingly, it is a general object of the present invention to provide a scale reading apparatus with improved dust-proof characteristics.

It is another object of the present invention to provide a scale reading apparatus which reads the gradations of the scale with a higher precision.

In keeping with the principles of the present invention, the objects are accomplished by an improved scale reading apparatus including a dust-proof means for protection of the slide and guide surfaces of the apparatus against the ingress of foreign material and a means for sensing a scale reading. The dust-proof means includes a flexible magnetic band covering the entire length of the slide surface and at least a pair of longitudinal magnets which are provided in the slide and along both sides of the guide opening. The scale reading means is resiliently mounted at an angle which is not vertical to the scale and which is preferably a 45° angle thereby substantially reducing the forces applied and the affects of vibration to insure a high precision reading.

BRIEF DESCRIPTION OF THE DRAWINGS

The above mentioned and other features and objects of the present invention will become more apparent by reference to the following description taken in conjunction with the accompanying drawings, wherein like referenced numerals denote like elements, and in which:

FIG. 3 is a front elevation knoll view broken in part of a scale reading apparatus in accordance with the teachings of the present invention;

FIG. 4 is a cross-sectional view of the embodiment of FIG. 3 looking along the line IV — IV;

DESCRIPTION OF THE INVENTION

Figure 1:
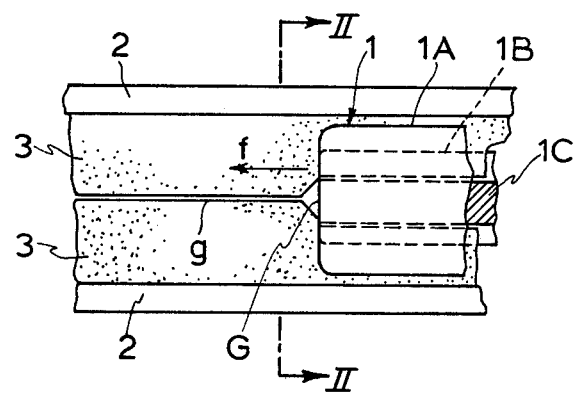
FIG. 1 is a front view of a dust-proofing means for a scale reading apparatus of the prior art.
Figure 2:
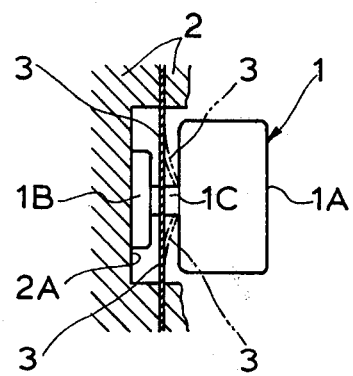
FIG. 2 is a side view of the prior art apparatus of FIG. 1 looking along the lines II — II.

Referring more particularly to the drawings, FIGS. 1 and 2 show a dust-proofing means for use in machinery or apparatuses incorporating sliding parts. In particular, such dust-proofing means is utilized in a scale reading apparatus of the prior art.

In FIGS. 1 and 2, slider member 1 moves along a slide guide surface 2A in the direction $f$ indicated by the arrow. The slider member 1 consists of an upper body 1A, a lower leg portion 1B and a neck portion 1C connecting the upper body 1A and the lower leg portion 1B. The slide guide surface 2A is covered for dust protection by a pair of strip-like flexible elements 3. The strip-like flexible elements 3 are secured along one longitudinal edge to the frame 2 and abut against each other along the other longitudinal edge. Accordingly, the coupled flexible elements 3 cover almost entirely the area of the slide guide surface 2A where the slider member 1 does not occupy so that the ingress of dust or dirt to the slide guide surface 2A is inhibited. However, as the slider member 1 moves in the direction of the arrow $f$ shown in FIG. 1, the flexible elements 3 will be spread apart as shown by the two dot chain lines in FIG. 2. In this case, there will be produced an opening G formed between the adjoining edges of the elements 3 and immediately ahead of the slide member during movement. Hence, foreign material such as dirt or dust can possibly enter through this opening G and go on to the slide guide surface 2A.

In addition to the above described possibility of ingress of foreign matter through the opening G, the prior art dust-proofing means has a further difficulty in that the coupled flexible strip elements 3 provide therebetween a minor gap $g$ through dirt or dust may likewise ingress onto the slide guide surface 2A. All together, it has been almost impossible with the known dust-proofing means to entirely prevent foreign material from adhering to the slide guide surface 2A.

Referring to FIGS. 3 through 6, shown therein is a scale reading apparatus in accordance with the teachings of the present invention. The scale reading apparatus in accordance with the teachings of the present invention, includes a housing 4 having a scale 5 provided therein. Housing 4 is adapted for mounting onto a machine tool, etc., not shown, by means of opposite mounting flanges 4A.

The housing 4 is a generally elongated hollow construction having a substantially rectangular cross-section. A guide opening 4B is formed in one side of the housing 4 and extends longitudinally along the length of the entire housing 4. The interior of the housing 4 communicates with the exterior only through the guide opening 4B. In spaced parallel relationship to the guide opening 4B is provided two parallel rail plates 4C which act as sealing members for the opening 4B and the slide surfaces. A slider member 6 is disposed for slidable movement along the two guide surfaces of the rail plates 4C in such a manner that the slider 6 will always be urged toward the rail plates 4C by the attraction of magnets 4E which are imbedded in the side wall of the housing 4 between the rail plates 4C and the opening 4B. The slider member 6 consists of a main body portion 62 adapted for slidable movement along the rail plates 4C and an extension portion 61 which extends through the guide opening 4B into the interior of the housing 4. The main body 62 is substantially box-shaped and accommodates an amplifier 7 having its output lead 8 extended outwardly through the side wall of the main body 62. Furthermore, as can best be seen in FIG. 3, the extension portion 61 of slider 6 has an arcuate guide portion 61A formed in the outboard side of extension portion 61.

A flexible strip band of steel or other magnetic material 9 extends along the entire length of rail plates 4C and covers the guide opening 4B. The flexible band 9 is secured at its opposite ends to the housing 4 by means of holding plates 4D. Within the range of the slider 6, however, the flexible band 9 is raised from the opening 4B by following the outer periphery of the arcuate protrudant guide portion 61A of the slider member 6. The band 9 at the edges of the slider 6 is urged against the rail plates 4C by holding rollers 62A provided in the inboard side of the main body 62 of the slider 6 while the remainder of the band 9 is kept in close contact with the rail plates 4C by the attraction of the magnets 4E.

Accordingly, the portion of the band 9 confined within the slider 6 is raised off the plates 4C by the arcuate portion 61A while the remainder covers the slide surfaces of the rail plates 4C and the guide opening 4B alike. To provide the smoothest possible sliding contact between the band 9 and the arcuate portion 61A, both of the two parts should be selected from a material having the least possible coefficient or friction.

From the foregoing description, it will be understood that the housing 4 moves relative to the slider 6 in either direction and the arcuate guide portion 61A of the slider 6 affects sliding movement upon and along the entire inner surface of the flexible band 9.

As shown in FIG. 3, the arcuate guide portion 61A is formed with a small hole 61B through which a lead, not shown, extends therethrough to electrically connect the amplifier 7 and a sensor to be described hereinafter. This lead connects to the amplifier 7 through an aperture 62D formed in the partition wall 62C of the slider main body 62.

Furthermore, the neck portion 61C of the extension portion 61 has provided therein a bore 61D through which the lead, not shown, for connecting the amplifier 7 and the sensor passes.

As shown, there is provided at the inner end of the sliders extension portion 61 a sensor holding member 10 carrying thereon sensors 101 for reading gradations on the scale 5. For mounting the holding member 10 to the extension portion 61 of the slider 6, a recessed portion 61E is provided in extension portion 61 and a support means 11 is coupled to the extension portion 61.

In FIG. 3, the support means 11 consists of two rows of balls 111 in a row placed around each side of the recess 61E and protruding slightly into the recess 61E. A leaf spring 112 adapted to urge one row of the two rows of balls inwardly is provided at one end of the extension portion 61. With this arrangement, when the sensor holding member 10 is assembled into the recess 61E in the direction indicated by arrow B in FIG. 3, the holding member 10 is snapped into the recess 61E and held in position elastically clamped between balls 111. When disassembling the apparatus, the member 10 is easily drawn out of the extension 61 in the direction of arrow A.

As shown in FIG. 4, the transparent glass scale 5 is secured to the housing 4 such that its surface inclines at an angle which is not normal to the X — X plane which includes the central axis of the slider 6 and the guide opening 4. In particular, the preferred angle is 45°. This inclination serves to insure smooth sliding movement of the sensor holding member 10 in the longitudinal direction of the scale 5, as will be described hereinafter, and constitutes one of the features provided by the present invention.

In correspondence with the inclination of the graduated surface of the scale 5, the sensor holding member 10 has outer surfaces in parallel with the graduated surface and a short side surface of the scale 5. On the side of the member 10 in parallel with the graduated surface of the scale 5, are provided an index scale 102 and sensors 101 such as phototransistors. In opposition to the sensors 101 are provided respectively optical projectors 103 such as light emitting diodes. The sensors 101, as described earlier, are connected with the lead, not shown, which would connect the sensors 101 to the amplifier 7.

Between the bottom of the recessed portion 61E of the sliders extension portion 61 and the sensor holding member 10 are provided a pair of biasing springs 12 to elastically urge the member 10 against the scale 5 and to absorb objectional vibrations of the parts possibly occurring during relative sliding movement of the two members. As a result of the springs 12, any vibration of the sensor holding member 10 will not be transmitted to the slider 6 thereby assuring smooth sliding movement of the slider 6. Furthermore, as a result of the support means 11, the sensor holding member 10 is allowed to move relative to the slider 6 so that vibrations of the member 10 are further isolated from slider 6.

Figure 6:
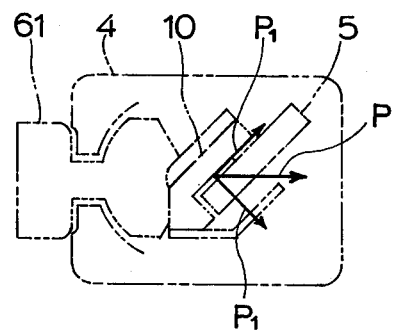
FIG. 6 is a diagrammatic view of the embodiment of FIG. 3 showing how the scale is acted upon by the forces applied.
Figure 5:
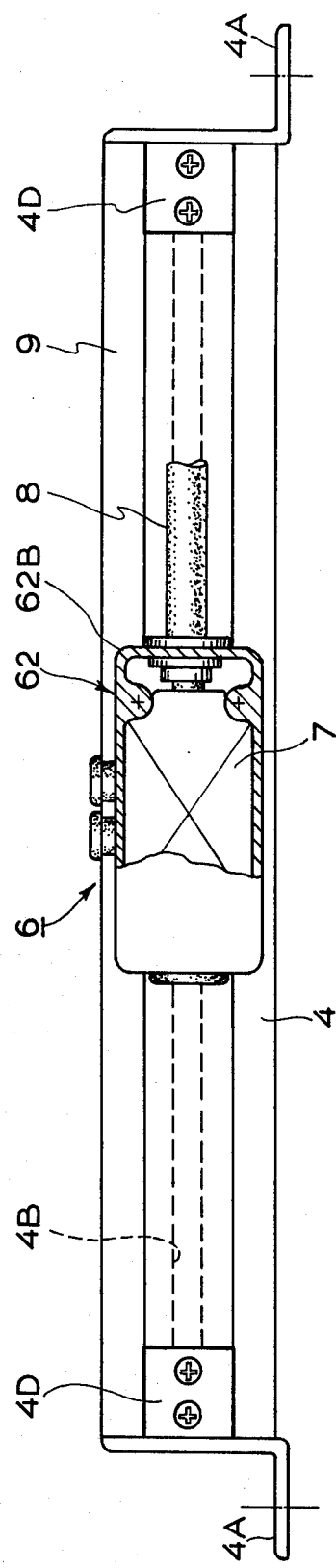
FIG. 5 is a side elevational view broken in part of the apparatus of FIG. 3.

Referring to FIG. 6, shown therein is a schematic view of how the sensor holding member 10 dynamically acts upon the scale 5. As a result of the inclination of the scale 5, the force P is effectively reduced by dividing it into two equivalent components $P_1$ and $P_2$ acting in the direction of the graduated surface and the short side of the scale 5 respectively. Accordingly, the force between the holder portion 10 and the front surface of the scale 5 is effectively reduced thereby effectively reducing the amount of force required to slide the holder portion 10 along the scale 5.

In summary, the scale reading apparatus according to the present invention offers a number of advantages enumerated below;

1. Since the whole area of the guide opening and the slide surfaces except for where the slider is positioned, is normally completely covered with a flexible band, the ingress of foreign material such as dust or dirt to or upon the guide opening and slide surfaces is avoided.

2. Since the holding member and the scale are in contact with each other at a contact plane inclination of 45°, the forces acting between the holding member and the scale are reduced thereby rendering sliding movement of the holding member smoother.

3. As a result of the elastic urging of the sensor holding member against the scale, vibrations of the holding member are absorbed by the springs without being transmitted to the slider thereby insuring that the slider movement is smooth.

4. The scale reading apparatus provides a high precision reading.

Though the invention had been described on the assumption that the slider is movable while the scale containing the housing is stationary, it is the usual case where the invention is actually applied that the housing with the scale in it is moved while the slider is stationary. Accordingly, it is to be understood that in the description of the present invention, the term "slider" does not necessarily mean a moving part, but rather means one of two parts adapted for relative movement.

In all cases it is understood that the above described embodiment is merely illustrative of but one of the many possible specific embodiments which can represent applications of the principles of the present invention. Numerous and varied other arrangements can be readily devised in accordance with these principles by those skilled in the art without departing from the spirit and scope of the invention.

I claim:
1. A scale reading apparatus comprising:
   a housing of hollow tubular construction;
   a transparent bar scale provided in said housing;
   a longitudinal guide opening in said housing extending in the longitudinal direction of said scale;
   a pair of slide surfaces extending parallel to said guide opening;
   a slider member for operative association with said housing, said slider having an extension portion extending from the exterior of said housing into the interior thereof through said guide opening;
   a sensor holding member detachably coupled to the end of said extension portion;
   a plurality of sensors for reading said scale provided in said sensor holding member;
   a magnetic means provided in the longitudinal side wall of said housing adjacent to said slide surfaces and along both sides of said guide opening;
   a flexible strip band extending longitudinally along and substantially covering the entire length of said guide opening, said flexible strip band being made of a magnetic material and being held in contact with said guide opening by said magnetic members;
   an arcuate protrudent guide portion formed in said extension portion of said slider member, said guide portion being in slidable contact with the inner surface of said strip band;
   holding members provided at the ends of said slider member to press down said strip band to said guide opening; and
   a means for detachably coupling said sensor holding member to said extension portion.

2. A scale reading apparatus according to claim 1 further characterized in that said scale is provided in said housing with a longitudinal surface inclined at an angle which is not normal to a plane normal to the surface of said band.

3. A scale reading apparatus according to claim 2 wherein said angle is 45°.

4. A scale reading apparatus according to claim 3 wherein said support means further comprises at least one resilient means provided between said sensor holding member and the end of said extension portion.

5. A scale reading apparatus according to claim 4 wherein said flexible strip band is made from steel.

6. A scale reading apparatus according to claim 4 wherein said resilient means comprises at least one spring.

* * * * *